United States Patent
Fuchs

(10) Patent No.: US 9,088,213 B2
(45) Date of Patent: Jul. 21, 2015

(54) METHOD FOR THE PHASE DIAGNOSIS OF A MULTIPHASE CONVERTER

(75) Inventor: Gerhard Fuchs, St. Andrä-Wördern (AT)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 309 days.

(21) Appl. No.: 13/579,902

(22) PCT Filed: Feb. 14, 2011

(86) PCT No.: PCT/EP2011/052138
§ 371 (c)(1),
(2), (4) Date: Aug. 17, 2012

(87) PCT Pub. No.: WO2011/101315
PCT Pub. Date: Aug. 25, 2011

(65) Prior Publication Data
US 2012/0306519 A1 Dec. 6, 2012

(30) Foreign Application Priority Data
Feb. 17, 2010 (DE) .......... 10 2010 008 274

(51) Int. Cl.
G01R 31/02 (2006.01)
H02M 3/158 (2006.01)

(52) U.S. Cl.
CPC ................ *H02M 3/1584* (2013.01)

(58) Field of Classification Search
CPC ............... H02M 3/1584; H02M 3/156
USPC .......... 324/750.01, 142, 76.11, 141; 327/233–237; 318/801, 803; 323/272; 361/18
See application file for complete search history.

(56) References Cited

U.S. PATENT DOCUMENTS

| | | | |
|---|---|---|---|
| 5,414,339 A * | 5/1995 | Masaki et al. | 318/800 |
| 6,897,636 B2 | 5/2005 | Harris | 323/272 |
| 7,477,045 B2 * | 1/2009 | Schuellein et al. | 323/272 |
| 2002/0044458 A1 | 4/2002 | Elbanhawy | 363/15 |
| 2003/0201761 A1 * | 10/2003 | Harris | 323/272 |
| 2009/0058379 A1 * | 3/2009 | Sreenivas | 323/241 |
| 2010/0164454 A1 * | 7/2010 | Rinne et al. | 323/282 |

FOREIGN PATENT DOCUMENTS

| | | | | |
|---|---|---|---|---|
| CN | 1643767 A | 7/2005 | | H02J 1/10 |
| CN | 1744405 A | 3/2006 | | H02H 7/08 |

(Continued)

OTHER PUBLICATIONS

German Office Action for Application No. 10 2010 008 274.0-32 (3 pages), Sep. 27, 2010.

(Continued)

*Primary Examiner* — Arleen M Vazquez
*Assistant Examiner* — Robert P Alejnikov, Jr.
(74) *Attorney, Agent, or Firm* — Slayden Grubert Beard PLLC

(57) ABSTRACT

A method for the phase diagnosis of a multiphase converter for detecting potential errors in individual converter phases is provided, wherein a symmetrical load distribution for the individual converter phases is regulated. During the operation of the converter, the distribution of the load prescribed for each individual phase of the converter is detected at least two different times, at different temperatures, and in any order.

6 Claims, 3 Drawing Sheets

(56) References Cited

FOREIGN PATENT DOCUMENTS

| | | | | |
|---|---|---|---|---|
| DE | 102007045220 A1 | 4/2009 | ............ | H02M 3/158 |
| DE | 102010008274 A1 | 8/2011 | ............. | H02M 1/32 |
| JP | 2009225541 A | 10/2009 | ............ | H02M 1/100 |
| WO | 2009/010476 A1 | 1/2009 | ............ | H02M 3/158 |
| WO | WO 2009010476 A1 * | 1/2009 | | |
| WO | 2011/101315 A2 | 8/2011 | ............ | H02M 3/158 |

OTHER PUBLICATIONS

International Search Report and Written Opinion for Application No. PCT/EP2011/052138 (11 pages), Sep. 1, 2011.

Chinese Office Action, Application No. 201180010033.9, 13 pages, Jun. 3, 2014.

* cited by examiner

METHOD FOR THE PHASE DIAGNOSIS OF A MULTIPHASE CONVERTER

CROSS-REFERENCE TO RELATED APPLICATIONS

This application is a U.S. National Stage Application of International Application No. PCT/EP2011/052138 filed Feb. 14, 2011, which designates the United States of America, and claims priority to German Application No. 10 2010 008 274.0 filed Feb. 17, 2010, the contents of which are hereby incorporated by reference in their entirety.

TECHNICAL FIELD

This disclosure relates to a method for the phase diagnosis of a multiphase converter in order to detect any faults in individual converter phases, with closed-loop control being provided to ensure a balanced load distribution for the individual converter phase.

In quite general terms, the disclosure relates to the phase diagnosis in the production process in multiphase DC/DC, AC/DC, DC/AC or AC/AC converters, namely current or voltage converters. This may involve in particular spot checks of such multiphase converters during the course of manufacture in order to ensure that the products produced (converters or control devices with converters) continuously meet the requirements as regards the avoidance of faults, in particular possible overheating in individual converter phases. The converters considered here are envisaged by way of example, but not exclusively, for motor electronics.

BACKGROUND

It is conventional in the manufacture of converters or converter devices to detect construction faults and/or component faults via unexpectedly quick heating of a converter phase using function tests or during final inspection or during subsequent runin inspection. For this purpose, a plurality of temperature sensors are generally provided in the converter, namely at least one sensor per phase and generally additionally a further temperature sensor which detects the overall temperature or housing temperature of the converter or converter device.

The multiple temperature information thus obtained can be used in the manufacture or else in the spot checking for the purpose of diagnostics in order to identify, for example, poor heat coupling to a heat sink in phase-specific fashion.

Secondly, it is also known to use DC/DC converters to transmit energy with a different DC output voltage, wherein in the simplest case, a switching device is provided which produces or interrupts a connection to a DC voltage source, with the duty factor of this switching device determining the level of the output voltage or the output current. In order to now achieve high powers, "multiphase" converters, namely converters with a plurality of units connected in parallel, are often used. These parallel units or phases are driven in phase-shifted fashion in order thus to enable a reduction or reduction in size of the required filter components.

In the case of such multiphase converters, the problem arises that, for example owing to component tolerances, an unbalanced load distribution, in particular current distribution (possibly also voltage distribution), can be provided on the individual phases even given the same pulse width of the PWM drive signal (PWM=pulse width modulation). However, this is undesirable since, firstly, the losses owing to the nonreactive resistance of the converter increase and thus the efficiency of the converter is impaired, and secondly, owing to an unevenly distributed current, for example, individual inductances enter saturation as a result of an excessively high phase current, which results in a reduction in the maximum power of the converter overall or in failure of one phase. Therefore, in practice, current balancing (generally: load balancing) is performed in the case of multiphase converter systems, for example, for which purpose conventional PWM closed-loop current control is provided. For example, the current of one phase is measured via a measuring resistor and calculated; the duty factors of the individual converter phases are in this case selected in such a way as to produce "balanced" (uniform) current splitting between the individual phases. This is realized by a corresponding adjustment of the respective phase duty factors, with it being possible for the individual duty factors to be completely different from one another. By virtue of balanced current splitting, both the influence of component tolerances and the effect of specific design imbalances in the construction of the converter, such as are caused by feed lines of different lengths to the respective phase, for example, can be reduced.

SUMMARY

In one embodiment, a method is provided for the phase diagnosis of a multiphase converter in order to detect any faults in individual converter phases, with closed-loop control being provided to ensure a balanced load distribution for the individual converter phases, wherein the splitting of the load preset for the individual phases of the converter is detected during operation of the converter at at least two different times, at different temperatures, in any desired sequence.

In a further embodiment, the splitting of the load preset is detected first when the converter is cold, at room temperature, and then after a predetermined operating duration, once the converter has heated up. In a further embodiment, a respective phase current is measured in each converter phase with the aid of current measurement means. In a further embodiment, a respective phase current is set in each converter phase with the aid of PWM means via a corresponding duty factor. In a farther embodiment, the duty factors of the PWM means of the individual phases are evaluated for detecting the splitting of the current preset for the individual converter phases. In a further embodiment, summation and/or averaging means are provided, which are connected to the current measurement means and whose output signal is used as setpoint value preset in the balancing of the phase currents in a balancing unit with phase controller means for each phase of the converter, the respective measured phase currents being supplied as actual value to the phase controller means of the balancing unit, and the phase controller means emitting actuating signals for the phase currents. In a further embodiment, the output signal of the summation and/or averaging means is moreover supplied as actual value to a summation current controller, which, corresponding to a setpoint value preset, derives phase current actuating signals which are combined with the individual actuating signals of the phase controller means. In a further embodiment, the splitting of the voltage presets for the individual phases of the converter is detected. In a further embodiment, the respective phase voltage is adjusted via a corresponding duty factor in each converter phase with the aid of PWM means.

BRIEF DESCRIPTION OF THE DRAWINGS

Example embodiments will be explained in more detail below with reference to figures, in which.

DETAILED DESCRIPTION

Figure 1:
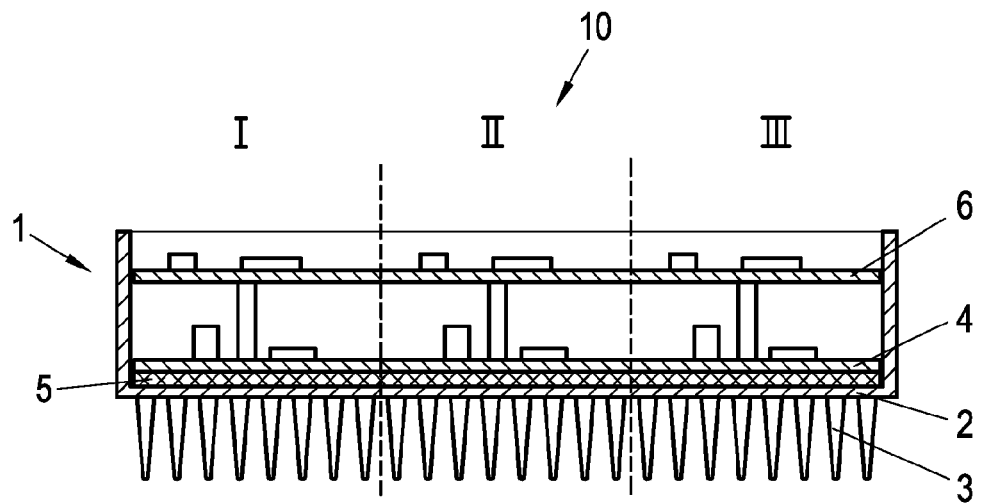
FIG. 1 shows a schematic cut-open view of a converter device with a printed circuit board attached to a heat sink via a thermal paste.

Some embodiments reduce the required structural complexity involved in a method as specified at the outset and in the process in particular to save on temperature sensors together with associated evaluation circuitry; as a result, the intention is also to achieve a cost saving, in respect of the reduction of the components and the thereby reduced manufacturing costs, and an improvement in quality, in respect of the reduced possibilities of faults, as well as a space saving as a result of a lower number of components on printed circuit boards (less physical space) and a simplification of the routing on printed circuit boards. In particular, some embodiments provide the possibility of process control, with spot checking, with the intention being for it to be possible to establish any deterioration of the process before devices need to be discarded because they are faulty.

Some embodiments are based on the knowledge that diagnosis is possible by observing the closed-loop balancing control, namely in such a way that a change in the splitting of the load preset or a duty factor of the converter phases depending on the temperature forms the basis for the diagnosis.

Some embodiments provide a method of the type specified at the outset that is characterized by the fact that the splitting of the load preset for the individual phases of the converter is detected during operation of the converter at at least two different times, at different temperatures, in any desired sequence. In the case of changes in the splitting of the load preset, it is possible to conclude that there is a deterioration of the process or, under certain circumstances, even a substantial fault in at least one phase. In this case, it may be preferred if the splitting of the load preset is detected first when the converter is cold, at room temperature, and then after a predetermined operating duration, once the converter has heated up.

Mention is made here, for reasons of completeness, of the fact that there are various converter topologies which can be used in the present method. These various converter topologies can be combined into three groups, as follows:

For example, the converters can be current converters which can adjust the output current directly; details will be given repeatedly by way of example below in respect of this embodiment.

Secondly, the converters can set the voltage, as voltage converters, with a step-up or a step-down conversion being provided, for example. In the case of parallel voltage converters of this type, the voltage preset, i.e. the voltage transformation ratio, is adjusted in order to achieve uniform current or load splitting. Therefore, the current is in this case adjusted indirectly via the voltage.

A possible third type is also series-connected voltage converters, for example in order to achieve relatively high voltage transformation ratios. In this embodiment, the current is always the same, and the desired balanced load splitting is in this case achieved by balancing of the output voltages of the series-connected voltage converters.

In the present method, therefore the splitting of the load preset (for example the current preset, possibly also the voltage preset, depending on the converter type) between the individual phases is detected first, for example, when the device is more or less cold, at room temperature. For example, in the case of a three-phase converter, the splitting of the current preset is assumed to be 34%/33%/33%. Then, the converter phases are subjected to a load for a time such that the entire converter is heated up. The change in temperature brings about changes in the converter response, to be precise generally a deterioration of the efficiency. After this heating, still in the warm state, the splitting of the phase loads is detected and evaluated anew. In this process, a change in the splitting of the current or generally load preset can take place, which can be attributed to various causes, in particular to hotspots in the converter. If there are imbalances owing to the design, these imbalances are known in advance and can accordingly be taken into consideration a priori. Changes going beyond these design-related imbalances, i.e. in particular changes in comparison with the results during measurement in the cold state with the same device, would indicate a fault in a respective phase, however. Such a changed splitting of the load preset can be diagnosed and assigned to the corresponding phase. For example, it is assumed that, in the abovementioned example of a three-phase converter, the splitting of the current preset is now, after heating, 30%/30%/40%. It can be assumed from this changed splitting that there is a fault in the third converter phase.

It is expedient to establish a permissible degree of discrepancy in the splitting of the current in advance, for example in order to take component tolerances, in particular in respect of constructed inductances, into consideration and in order to avoid apparent faults. Cited merely by way of example here is the fact that discrepancies of ±5% may be entirely acceptable. Of course the respective permissible degree of discrepancy in the splitting of the current preset should be determined depending on the respective purpose and the respective device and therefore correspondingly individually.

In some embodiments, no distinction is made between manufacturing errors, for example poor thermal coupling of components to the heat sink, and component errors (excessive heating, impermissible temperature dependence of the various electrical parameters); insofar as component faults are the cause for abnormal heating, such faults should not occur when the circuit groups used have already been checked in advance, prior to assembly. It is then possible, with the aid of the present method, for specifically excess heating owing to poor thermal coupling, i.e. insufficient cooling or heat dissipation, to be determined.

For uniform splitting of phase currents (balancing of the phase currents) it is favorable if a respective phase current is measured with the aid of current measurement means in each converter phase.

Furthermore, it may also be advantageous in this regard if a respective phase current is set in each converter phase with the aid of PWM means via a corresponding duty factor.

This also results in a simple diagnosis possibility during the course of the present method when the duty factors of the PWM means of the individual phases are evaluated for detecting the splitting of the current preset for the individual converter phases.

In some embodiments, summation and/or averaging means are provided, which are connected to the current measurement means and whose output signal is used as setpoint value preset in the balancing of the phase currents in a balancing unit with phase controller means for each phase of the converter, the respective measured phase currents being supplied as actual value to the phase controller means of the balancing unit, and the phase controller means emitting actuating signals for the phase currents. In this case, it is furthermore also favorable if the output signal of the summation and/or averaging means is moreover supplied as actual value to a summation current controller, which, corresponding to a setpoint value preset, derives phase current actuating signals which are combined with the individual actuating signals of the phase controller means. The phase current actuating signals can be simply additively combined with the individual actuating signals of the phase controller means, for example.

In particular, certain embodiments allow virtually all temperature sensors together with the evaluation circuitry involved to be dispensed with; if appropriate, one temperature sensor can remain which can act as overload sensor at a hotspot of the device. Owing to the reduction in the number of temperature sensors, in total fewer components are required as a result, which reduces the manufacturing costs and thus results in a cost saving. Fewer components in the converter device furthermore also mean fewer potential faults, i.e., fewer faults occur, with the result that an improvement in quality overall is also provided. Finally, by virtue of the fact that fewer components are constructed, less physical space or less printed circuit board area is required, which results in a space saving and in a more compact design and moreover also in a simplification of the line routing on the printed circuit board.

FIG. 1 illustrates, purely schematically, in a cut-open view, a trough-shaped housing lower part 1, which at the same time acts as heat sink 2 and is provided with cooling ribs 3 on the lower side, for example. A printed circuit board 4, namely a power printed circuit board 4 in the example shown, is positioned on this heat sink 2 via a thermal paste 5, which is applied in the form of a relatively thin layer between the planar upper side of the heat sink 2 and the lower side of the printed circuit board 4. Such a thermal paste has long been known per se; it is electrically insulating, but enables effective heat dissipation or coupling of the respective circuit board 4 to the housing, in this case to the heat sink 2.

Above the power printed circuit board 4, FIG. 1 also illustrates schematically a control printed circuit board 6, which, in the same way as the power printed circuit board 4, belongs to a multiphase converter 10.

Finally, three phases I, II and III of the converter 10 shown are illustrated schematically, separated by dashed lines, in FIG. 1. In general, the converter units have an identical design and provide, for example, in each case a specific output voltage, in particular DC voltage, with it being possible for these output voltages, having been converted in the individual phases, to be connected together by combining the phases in order to thus achieve a correspondingly higher output current. For example, in the field of motor vehicle electronics, output voltages (DC voltages) of the order of magnitude of 12 V at maximum currents of 65 A are then conceivable; it is possible per se for the respective converter device to be designed for 750 W, for example.

It can be seen from this that, at such powers, corresponding heating of circuit elements, and therefore in particular also the power printed circuit board 4, is involved, for which reason as effective coupling to the heat sink 2 as possible is important here.

Figure 2:
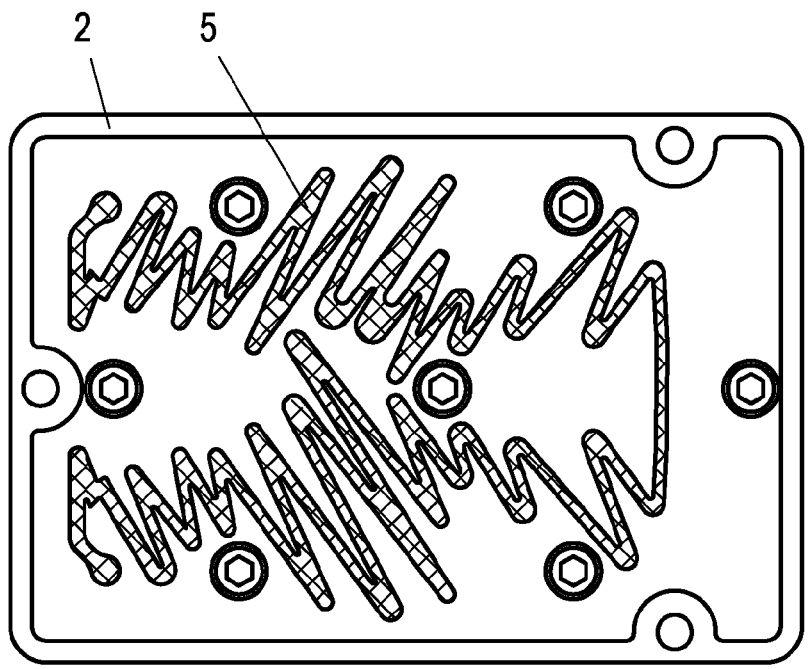
FIG. 2 shows a plan view of the heat sink with a thermal paste applied thereon with a zigzag formation.
Figure 3:
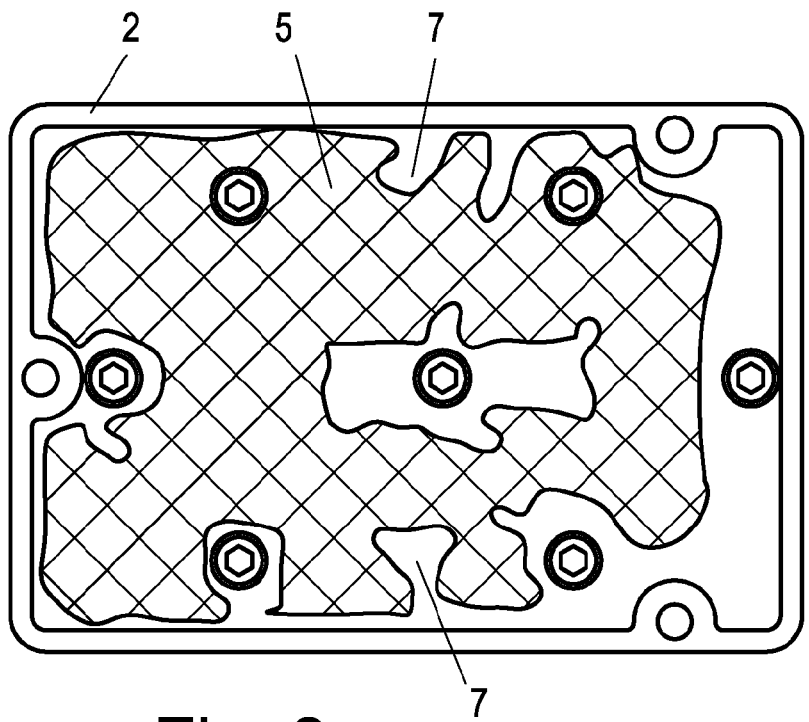
FIG. 3 shows a plan view of this heat sink shown in FIG. 2, with the thermal paste now spread evenly, once the printed circuit board shown in FIG. 1 has been pressed on, but with paste-free regions remaining erroneously, where coupling of the printed circuit board to the heat sink and therefore good heat dissipation is accordingly not provided.

For this coupling of the circuit to the heat sink 2 (or to a housing, quite generally), the thermal paste 5 is used, as has been mentioned; this thermal paste 5 is applied, for example with a zigzag or meandering formation, on the upper side of the heat sink or intermediate shelf 2, as can be seen from the practical example in FIG. 2, at the beginning in a still fluid state. In this case, the thermal paste 5 is still spreadable or fluid, and it is then necessary for the respective printed circuit board 4 (see FIG. 1) to be pressed onto the heat sink or intermediate shelf 2, generally housing part 1, quickly before the thermal paste 5 can cure in order thus, by virtue of the applied pressure, to cause the thermal paste 5 to flow and to be distributed and thus to bring about a thin layer in the required regions which is as uniform as possible; cf. FIG. 3. In the example shown in FIG. 3, however, the layered thermal paste 5 is interrupted at a plurality of flaws 7, for example by air bubble-like inclusions, and a poor cooling effect for the power printed circuit board 4 fitted thereabove (see FIG. 1) results at these points. During operation of the multiphase converter 10, this means that, after a certain operating time, and therefore after corresponding heating, excessive heating results in the region of the converter 10, i.e. in the region of that phase where these bare flaws 7 are located, which results in power losses in this part or in this phase of the converter 10.

It is now necessary to establish manufacturing process deteriorations or manufacturing faults of this type when the converter 10 is finished using a very simple technology, wherein in particular it is necessary to avoid the need for a large number of temperature sensors to be fitted to the printed circuit board 4 in order to be able to detect and localize corresponding overheating. In the present procedure, instead of a large number of temperature measurements which need to be performed continuously, the current or voltage splitting, depending on converter type, therefore generally the load splitting between the individual phases I, II, III of the converter 10, is detected twice, for example, wherein when such faults as indicated at 7 in FIG. 3 or similar faults are present which result in excessive heating, the splitting of the load preset between the individual phases, which is intended to be as uniform, i.e. "balanced", as possible, will undergo a change. It is then possible to draw a conclusion on the fault present from this change in the load splitting or load preset, inversely.

Figure 4:
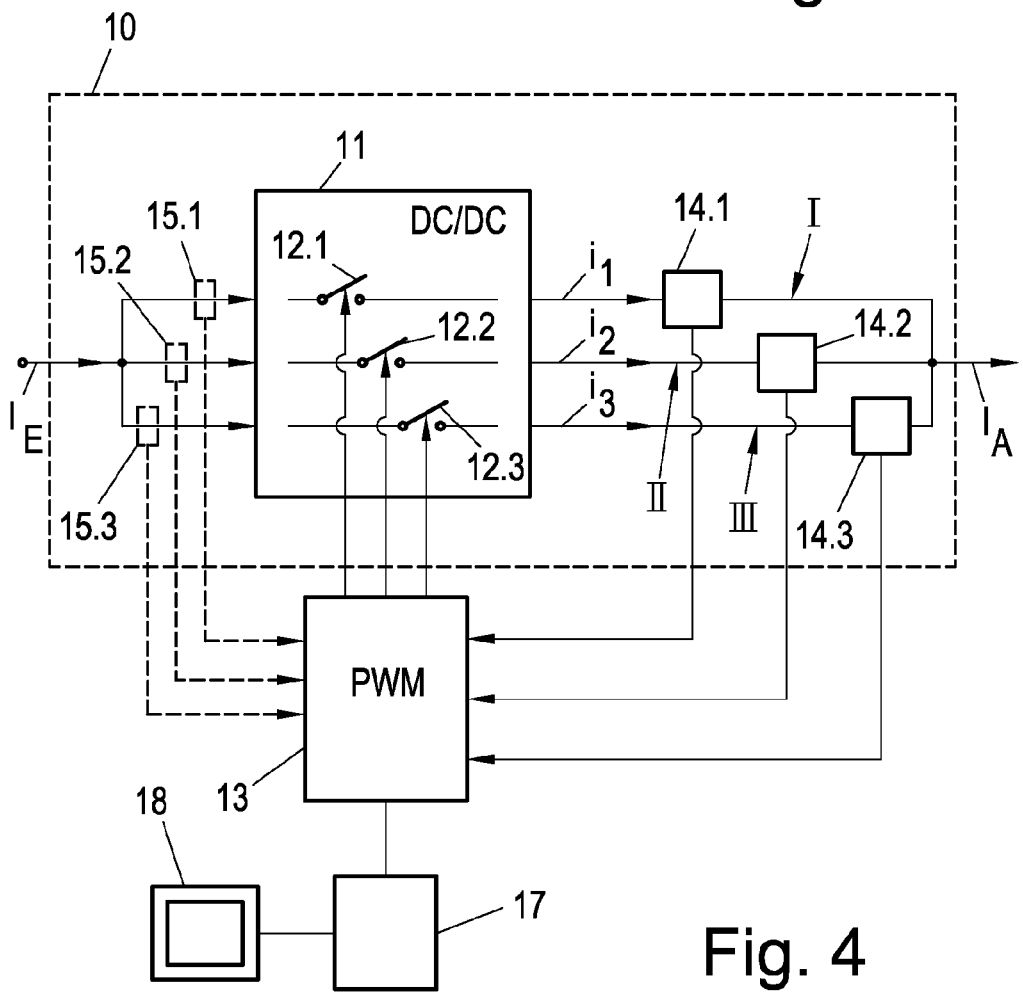
FIG. 4 shows very schematically a block circuit diagram of a three-phase converter with current measurement means in the individual phases and with a PWM actuator connected thereto.

FIG. 4 now illustrates a very schematic block circuit diagram of such a converter 10, for example a current converter with a PWM converter circuit 11, which contains a plurality of switching devices 12.1, 12.2 and 12.3, one for each of the converter phases I, II and III. These switching devices 12.1, 12.2 and 12.3 are indicated very schematically in FIG. 4 and in practice are formed by electronic switches, for example field effect transistors, as is known per se.

These switching devices 12.1, 12.2 and 12.3 are driven by a PWM actuator 13, which has a corresponding three-phase design; this PWM actuator 13 receives, as input signals, measurement signals from output-side current measurement means 14.1, 14.2 and 14.3, and/or from input-side current measurement means 15.1, 15.2, 15.3 as illustrated by dashed lines in FIG. 4, to be precise in each case one current measurement means for a respective phase I, II, III. The PWM actuator 13 and the switching devices 12.1, 12.2 and 12.3 therefore together form PWM means for adjusting (for dimming) the respective phase current $i_1$, $i_2$ and $i_3$.

The merging of the three phases is also indicated at the output in FIG. 4 in order to result in a correspondingly high individual output current $I_A$. Correspondingly, the parallel supply of an input current $I_E$ to the converter circuit 11, i.e. to the individual three phases, is shown on the input side.

Finally, an evaluation unit or circuit 17 is also connected to the PWM actuator 13, said evaluation unit or circuit detecting the duty factors for making and breaking the switching devices 12.1, 12.2 and 12.3 which are calculated on the basis of the measurement of the individual phase currents $i_1$, $i_2$ and $i_3$. This detection of the duty factors takes place according to phase, with the result that, in the event of a change in the duty factors related to the respective phase I, II and III during operation, for example in the event of heating of the converter 10 directly after said converter has been switched on from room temperature to a higher temperature after correspondingly long loading, these phase-related duty factors can be detected. If the phase current splitting given such heating changes from more or less balanced splitting provided originally via the closed-loop control provided to an unbalanced distribution, for example from a distribution of 34%/33%/33% to a distribution of 30%/30%/40%, or else from a ratio of the PWM duty factors of, for example, 81%/80%/80% to 79%/79%/92%, it can be concluded that there is a manufacturing fault or excessive heating as a result of poor heat dissipation in a respective phase, for example in phase III, or that there is an increasing deterioration in the production process. If, on the other hand, the splitting of the current preset remains virtually unchanged, with it being possible to establish limits for this, for example ±5%, depending on the circuit, use or purpose, it can be concluded that there is a constant quality of the manufacturing process.

The evaluation unit 17 can be realized in a simple manner by a microcomputer or microprocessor and can be integrated per se in the converter 10, can be in the form of a separate control printed circuit board 6 (see FIG. 1) or else can be provided as a separate device, which is connected via a diagnosis connection to the converter 10 in general, specifically to a signal output, for example of the PWM actuator 13 as shown, where the phase-specific duty factors are tapped off. The evaluation circuit 17 can in this case also have an associated viewing device 18 in order to be able to visually represent any imbalances in the current splitting immediately.

Figure 5:
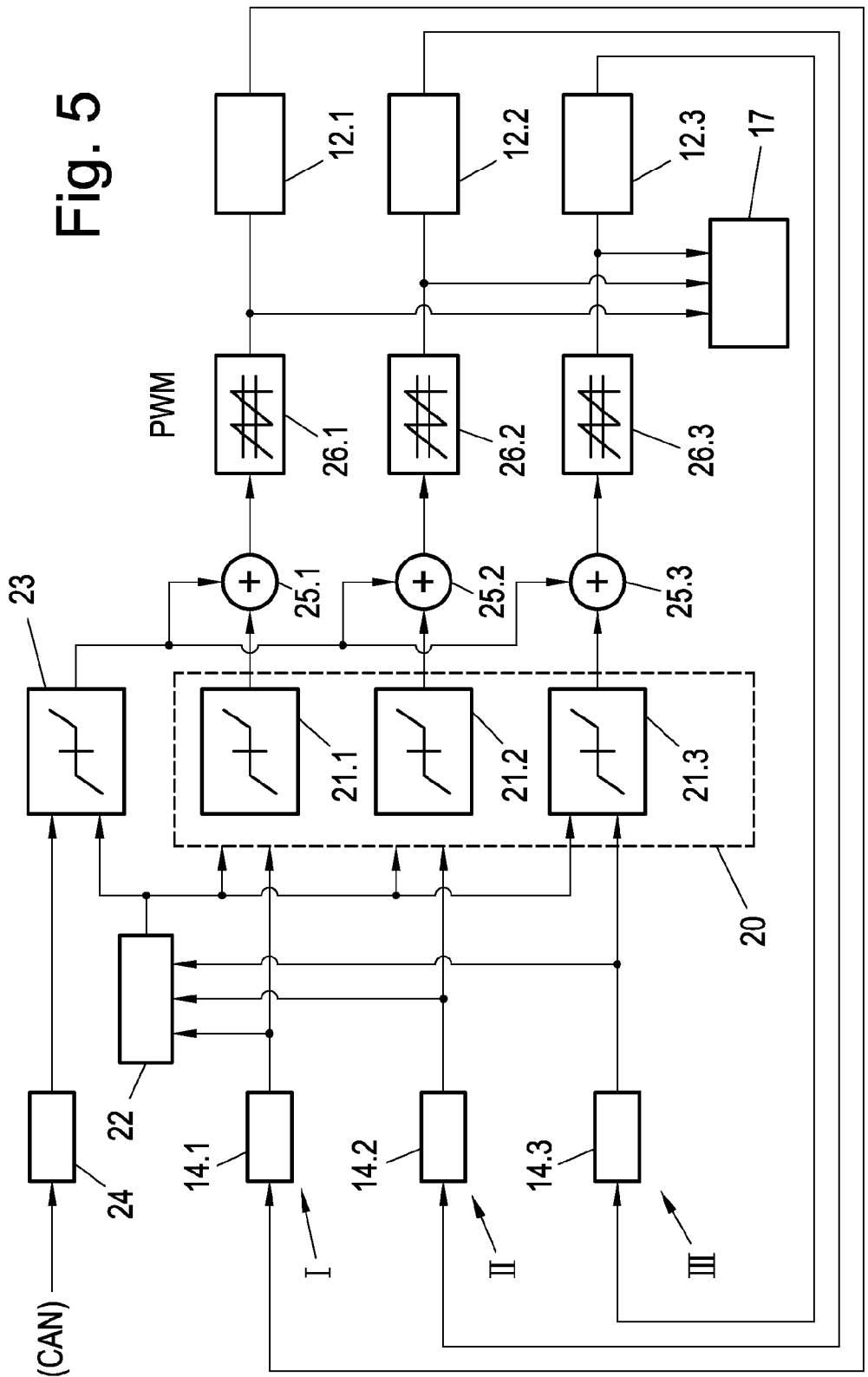
FIG. 5 shows a control-engineering equivalent circuit diagram of such a three-phase converter.

In the control-engineering equivalent circuit diagram shown in FIG. 5, it is specifically illustrated that the current measurement means 14.1, 14.2 and 14.3 are present in the three phases I, II and III and are connected to a balancing unit 20, in this ease with three phase controller means 21.1, 21.2 and 21.3, in each case one phase controller means for each of the three phases I, II and III. The phase controller means 21.$i$ (where i=1, 2, 3) thus receive the current values ii measured by the current measurement means 14.$i$ as actual values and corresponding averaged current value presets are supplied thereto from summation and/or averaging means 22 as setpoint values. These summation and/or averaging means 22 are connected with their inputs to the outputs of the current measurement means 14.$i$; furthermore, these means 22 are connected on the output side to a summation current controller 23, to which furthermore a setpoint value preset 24 is assigned depending on the type and purpose of the converter 10. In this case, the setpoint values can be supplied to the summation current controller 23, for example in the case of motor vehicle electronics via a CAN bus.

The individual units 20, 22 and 23 can be realized by computer or controller components which are conventional per se.

The balancing unit 20, or to be more precise the phase controller means 21.$i$ thereof, emit actuating signals for the PWM switching devices 12.$i$. These actuating signals at the phase controller means 21.$i$ are combined additively with the phase current actuating signals of the summation current controller 23, however, as is indicated schematically in FIG. 5 by adders or summers 25.1, 25.2 and 25.3. Means 26.1, 26.2 and 26.3 for calculating the respective PWM duty factors are connected to said adders or summers, with the switching devices 12.1, 12.2 and 12.3 in turn being connected to said means.

Finally, FIG. 5 also illustrates the detection of the duty factor adjustments for the switching device 12.$i$ with the aid of the evaluation unit 17.

The present method has been explained above in detail in particular using the example of converter types in which the current is adjusted or regulated, with the result that in the context of the present method, corresponding splitting of the current preset is performed. As has already been explained at the outset, such converters can be current converters or else voltage converters connected in parallel, in which the current is adjusted indirectly via the voltage. However, the technology according to certain embodiments can of course also be applied to voltage converters connected in series in order to achieve relatively high voltage transformation ratios. With this type of converter, the current is apparently always the same, and the symmetrical load splitting is achieved by balancing of the output voltages. In this case, as will be clear to a person skilled in the art, corresponding voltage measurement means need to be provided instead of the above-described current measurement means illustrated in the drawing in order thus to perform the desired voltage splitting (as load splitting).

What is claimed is:

1. A method for the phase diagnosis of a multiphase converter to detect faults in individual phases of the converter, the method comprising:
providing closed-loop control configured to provide a balanced load distribution for the individual converter phases, performing multiple detections of a distribution of the load between the individual phases of the converter at two or more different times during operation of the converter, and at different temperatures, including:
performing a first detection of the distribution of the load between the individual phases of the converter when the converter is at a first temperature, and
performing a second detection of the distribution of the load between the individual phases of the converter when the converter is at a second temperature higher than the first temperature, and
determining a fault based on the calculated changes in the distribution of the load.

2. The method of claim 1, comprising:
performing the first detection of the distribution of the load when the converter is at room temperature, and
Performing the second detection of the distribution of the load after the converter has heated up due to a predetermined operating duration.

3. The method of claim 1, comprising detecting the distribution of the voltage for the individual phases of the converter.

4. A system for the phase diagnosis of a multiphase converter to detect faults in individual converter phases, comprising:
a controller configured to provide control over a balanced load distribution for the individual converter phases, and
an evaluation circuit configured to:
perform multiple detections of a distribution of the load between individual phases of the converter at two or more different times during operation of the converter, and at different temperatures, including:

a first detection of the distribution of the load between the individual phases of the converter when the converter is at a first temperature, and a second detection of the distribution of the load between the individual phases of the converter when the converter is at a second temperature higher than the first temperature, calculate changes in the distribution of the load based on the multiple detections of the distribution of the load at different times and at different temperatures, and determine a fault based on the calculated changes in the distribution of the load.

5. The system of claim 4, wherein the evaluation circuit is configured to perform the first detection of the distribution of the load when the converter is at room temperature, and the second detection of the distribution of the load after a predetermined operating duration, once the converter has heated up.

6. The system of claim 4, wherein the evaluation circuit is configured to detect the distribution of the voltage for the individual phases of the converter.

\* \* \* \* \*